US012206153B2

(12) United States Patent
Arnold et al.

(10) Patent No.: US 12,206,153 B2
(45) Date of Patent: Jan. 21, 2025

(54) RIDGED WAVEGUIDE ARRANGEMENT CONTAINING A FIRST RIDGE WAVEGUIDE OVERLAPPING A SECOND WAVEGUIDE TO PRODUCE A CAPACITIVE COUPLING THERE BETWEEN

(71) Applicant: Tesat-Spacecom GmbH & Co. KG, Backnang (DE)

(72) Inventors: Christian Arnold, Backnang (DE); Sebastian Bartz, Backnang (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 260 days.

(21) Appl. No.: 17/858,225

(22) Filed: Jul. 6, 2022

(65) Prior Publication Data

US 2023/0009684 A1 Jan. 12, 2023

(30) Foreign Application Priority Data

Jul. 8, 2021 (DE) ......................... 102021117640.9

(51) Int. Cl.
*H01P 5/02* (2006.01)
*H01P 3/123* (2006.01)

(52) U.S. Cl.
CPC .............. *H01P 5/024* (2013.01); *H01P 3/123* (2013.01)

(58) Field of Classification Search
CPC ................................. H01P 5/024; H01P 3/123
USPC ...................................... 333/248, 24 R, 24 C
See application file for complete search history.

(56) References Cited

U.S. PATENT DOCUMENTS 3,292,115 A * 12/1966 La Rosa ................. H01P 3/122 333/252
3,629,734 A 12/1971 Siekanowicz et al.
4,720,693 A 1/1988 Tikes
6,515,562 B1 * 2/2003 Takenoshita et al. .. H01P 3/121 333/248
10,644,373 B2 * 5/2020 Deleniv et al. ........ H01P 1/2016
2011/0074528 A1 * 3/2011 Pardo et al. ............ H01P 7/065 333/250
2019/0123447 A1 4/2019 Arnold et al.

FOREIGN PATENT DOCUMENTS

CN 101485038 A 7/2009
CN 105633524 A 6/2016
DE 10 2017 124 974 B3 2/2019
WO 2008005146 A2 1/2008

OTHER PUBLICATIONS

Extended European Search Report for Application No. 22181787.7 dated Nov. 4, 2022, 3 pages. [See p. 2, categorizing the cited references].

* cited by examiner

*Primary Examiner* — Benny T Lee
(74) *Attorney, Agent, or Firm* — Lerner David LLP

(57) ABSTRACT

A waveguide arrangement contains a first ridged waveguide and a second waveguide. The first ridged waveguide contains a first casing with a first cavity and a first ridge extending in the first cavity in the longitudinal direction. The first ridge is conductively connected to a wall of the first casing. The second waveguide contains a second casing with a second cavity. The first ridged waveguide overlaps the second waveguide in the longitudinal direction of the waveguide arrangement in a connecting section to produce a capacitive coupling between the first ridge and the second waveguide.

10 Claims, 3 Drawing Sheets

RIDGED WAVEGUIDE ARRANGEMENT CONTAINING A FIRST RIDGE WAVEGUIDE OVERLAPPING A SECOND WAVEGUIDE TO PRODUCE A CAPACITIVE COUPLING THERE BETWEEN

FIELD OF THE INVENTION

The present invention relates generally to the technical field of radio-frequency engineering and relates in particular to a waveguide arrangement with a first ridged waveguide and a second waveguide, which are connected to one another in a connecting section in order to be able to transmit signals between the first ridged waveguide and the second waveguide.

BACKGROUND OF THE INVENTION

In radio-frequency engineering, that is to say for transmitting and processing signals at very high frequencies, for example signals distinctly above 1 GHz through to 35 to 40 GHz, waveguides are normally used to transmit radio-frequency signals between components. Components that operate with signals at high frequencies are widely used in communication satellites, in particular.

Radio-frequency connections may be used as part of satellite transmission links, for example. The satellite transmission link may be for example a Ka-band transmission link in a frequency range of 17.7-21.2 GHz for the downlink and 27.5-31 GHz for the uplink, a Ku- or X-band implementation in the range around 11 or 7 GHz, or an L-band (around 1.5 GHz), S-band (around 2.5 GHz) or C-band implementation (around 4 GHz).

With the increasing prevalence of satellite constellations in low and medium Earth orbit, demands on the devices as regards payload are increasingly changing toward lower costs and larger quantities. As a rule, small efficient electronic assemblies are required for constellations, for example in order to control active antennas and transmit signals via multiple channels in parallel. These electronic assemblies are usually equipped with radio-frequency amplifiers and the control therefor, and also passive radio-frequency subassemblies (filters, crossovers, insulators, couplers, etc.). In particular, in the case of active antenna structures, these assemblies usually consist of multiple parallel processing paths.

DE 10 2017 124 974 B3 describes an option for a modular connection between two radio-frequency components, the modular connection comprising two interfaces to each of which an active or passive radio-frequency component or a radio-frequency line may be connected.

Two waveguides may be connected at their connection interface, for example by using a flange. Alternatively, radio-frequency signals may be transmitted using coaxial lines, which in turn have appropriate connection techniques available for them.

Even though the connection techniques hitherto meet the demands made of them, there may be a need for an improved connection technique between two waveguides. In particular the use of waveguides and waveguide technology in large quantities has resulted in a need for miniaturization in this field.

SUMMARY OF THE INVENTION

An aspect of the invention may relate to improving the making of a connection between two waveguides, in particular ridged waveguides, such that the space requirement for the connection is reduced without adversely affecting the quality of the signal connection as a result.

According to a first aspect, a waveguide arrangement with a first ridged waveguide and a second waveguide is specified. The first ridged waveguide contains a first casing with a first cavity and a first ridge extending in the first cavity in the longitudinal direction, the first ridge being conductively connected to a wall of the first casing. The second waveguide contains a second casing with a second cavity. The first ridged waveguide overlaps the second waveguide in the longitudinal direction of the waveguide arrangement in a connecting section to produce a capacitive coupling between the first ridge and the second waveguide.

In a preferred embodiment, the first casing comprises a first window and the second casing comprises a second window, wherein the first window overlaps the second window in the connecting section. In a preferred embodiment, both the first ridged waveguide and the a second waveguide are stepped having multiple steps in the longitudinal direction in the a connecting section and two steps of the first ridges waveguide and the second ridged waveguide are complementary with respect one another. The overlap between the first ridged waveguide and the second waveguide is achieved by virtue of the two complementary steps of the first ridged waveguide and the second ridged waveguide abutting one another when the first ridged waveguide abuts the second waveguide, as a result of which an assembled state of the waveguide arrangement is defined. The first window and the second window are each arranged in a step area in the gradation, these two step areas extending in the longitudinal direction of the waveguide arrangement (i.e. horizontally), as a result of which the first window and the second window are opposite in the assembled state and thereby overlap.

Thus a separate connecting element between the first ridged waveguide and the second ridged waveguide. Rather, the two ridged waveguides are configured such that they comprise mutually corresponding sections in the connecting section. These sections are directly connected to one another, which produces a capacitive coupling between the first ridged waveguide and the second ridged waveguide and allows radio-frequency signals to be transmitted.

This design reduces the space requirement for the waveguide arrangement because the separate connecting element is dispensed with.

The waveguide arrangement described here may be used to connect a ridged waveguide to a conventional waveguide (i.e., without a ridge in the cavity). In this variant, an electromagnetic wave propagating along the ridge is coupled into the second waveguide (or vice versa). However, it is equally possible for two ridged waveguides to be connected to one another.

Unless indicated otherwise, the term "connected" or "connection" should be understood within the context of this description to mean that a communicative connection for transmitting signals, in particular radio-frequency signals, is involved. This does not preclude a "connection" from also being able to be a mechanical connection, but, unless explicitly indicated or identified otherwise, a signal transmission connection is always present if the general term "connection" is used.

Similarly, the term "signal" should be understood to mean that radio-frequency signals as mentioned in the introductory part above are involved, unless a signal is explicitly defined differently at a juncture.

According to one embodiment, the second waveguide is a ridged waveguide and comprises a second ridge extending in the second cavity in the longitudinal direction, wherein the second ridge is conductively connected to a wall of the second housing, and wherein the first ridged waveguide overlaps the second waveguide in the longitudinal direction of the waveguide arrangement in a connecting section to produce a capacitive coupling between the first ridge and the second ridge.

According to a further embodiment, at least sections of the second ridge overlap the first casing in the longitudinal direction in the connecting section.

Thus, a radio-frequency signal (RF signal) is allowed to be capacitively transmitted or coupled in from the second ridge to the first casing and the ridge thereof (or vice versa).

According to a further embodiment, at least sections of the first ridge overlap the second casing in the longitudinal direction in the connecting section.

In the same way as the second ridge overlaps the first casing in the longitudinal direction, the first ridge also overlaps the second casing, according to this embodiment.

To put it in quite general terms, and not just with reference to this embodiment, the cross-section of the first ridged waveguide and the cross-section of the second ridged waveguide are altered along the longitudinal direction of the waveguide arrangement in the connecting section of the waveguide arrangement so that the two ridged waveguides may be connected to one another in a space-saving manner in the connecting section.

While an electromagnetic wave propagates along the longitudinal direction of the ridged waveguide and the ridge in each ridged waveguide, the direction of propagation of the electromagnetic wave is changed in the connecting section. In the connecting section, the direction of propagation changes and is oriented transversely with respect to the longitudinal direction of the waveguide arrangement so that the electromagnetic wave to be transmitted is transmitted from one ridged waveguide to the other ridged waveguide. After the crossover in the connecting section, the electromagnetic wave then propagates in the other ridged waveguide in the longitudinal direction of the ridged waveguide again.

According to a further embodiment, at least sections of the first ridge overlap the second ridge in the longitudinal direction in the connecting section.

In a variant, it is possible for the ridges to extend in the longitudinal direction and into the connecting section to the degree that there is an overlap between the two ridges in the longitudinal direction. This improves the quality of the capacitive coupling between the two ridges.

The ridges of the two ridged waveguides are preferably aligned with one another without offset in a direction transverse with respect to the longitudinal direction. The ridges may be identical in terms of their shape and their proportions, e.g. may be of the same height and the same width and project into the connecting section to the same extent. In a transverse direction, the ridges are preferably arranged without offset in relation to one another, i.e. the ridges overlap completely in the transverse direction and one ridge does not extend out beyond the other ridge at the side.

According to a further embodiment, the first casing comprises a first window, the second casing comprises a second window, and the first window overlaps the second window in the connecting section.

The window is an opening in the outer wall of a casing of the ridged waveguide. This opening produces the capacitive coupling between the two ridges of the ridged waveguides.

According to a further embodiment, the first window and the second window are of identical proportions and shape and overlap one another without offset.

Thus a clear connection (in the sense of a clear line of sight) is produced between the cavity of the first ridged waveguide and the cavity of the second ridged waveguide. The electromagnetic wave propagates along one ridge in the waveguide arrangement, is then transmitted to the other ridge through the windows in the connecting section by means of capacitive coupling, and continues to propagate along the other ridge.

According to a further embodiment, at least part of the first ridge overlaps the first window in the longitudinal direction and/or at least part of the second ridge overlaps the second window in the longitudinal direction.

A front end face of the first and/or second ridge is therefore situated between the two edges of the window that are opposite in the longitudinal direction of the ridged waveguide.

According to a further embodiment, the first window is completely surrounded by an electrically conductive adhesive in the circumferential direction, the adhesive defining an adhesive area that completely surrounds the first window, wherein the adhesive adhesively bonds the first ridged waveguide to the second ridged waveguide.

The adhesive may be a metallized adhesive, for example. This adhesive is applied to the adhesive area and the two ridged waveguides are brought into contact with one another in the connecting section and thereby also mechanically connected.

The adhesive surrounds the first window and also the second window, with the result that the RF connection is insulated against external electromagnetic influences in this region and is itself also not an interference factor for adjacent signal connections.

By way of example, the waveguide arrangement may comprise multiple spatially juxtaposed transmission channels that each comprise a ridge in the cavity of the waveguide. Each transmission channel is characterized by two ridges capacitively connected to one another via the windows described earlier on. So that these transmission channels do not influence one another, the adhesive is arranged so as to surround the respective windows, with the result that the adhesive area is a closed polygon around the window. An adhesive area of this kind is preferably arranged around every single window of all transmission channels in the form of a closed line, in order to eliminate interfering influences on and from the capacitive coupling points.

According to a further embodiment, the first ridged waveguide and the second ridged waveguide have point symmetry, i.e., rotational symmetry of order 2 with respect to one another in the connecting section (i.e., origin symmetry with the connecting section as the origin).

It is thus possible for any two ridged waveguides to be connected to one another, because their connecting sections are identical to one another and allow a mechanical and electrical connection when the two ridged waveguides are appropriately oriented in relation to one another.

According to a further embodiment, at least sections of the first ridge have a height in the connecting section that is lower than the height of the first ridge outside the connecting section.

The height, or the cross-section, of the ridge and also of the casing of the ridged waveguides is altered in the connecting section so that the two ridged waveguides match one another. In particular, the ridged waveguides are connected to one another or assembled in such a way that they have a constant outer circumference and shape along the longitudinal direction of the connecting section. In particular this keeps down the space requirement for the waveguide arrangement containing the two connected ridged waveguides.

The waveguide arrangement as described herein may be used for example in order to make RF signal connections in a communication satellite, since in particular the parameter of a low space requirement for the electronics plays an important role in this environment. The waveguide arrangement and the connection technique described here may be used to make a spatially compact connection between RF components, for example within the realm of active antennas, which may also be referred to as a phased array. Within this realm, the distance between adjacent modules is normally very short because the distance between the antennas influences the power thereof. An active antenna generally consists of a two-dimensional arrangement of antennas (e.g. horn, patch or dipole antennas). Each antenna normally has an associated power amplifier (in the case of signal transmission), or an associated low-noise amplifier (in the case of signal reception), the maximum dimensions of which are determined by the antenna. It is also possible for multiple antennas to be combined with such an amplifier module, which contains a number of independent amplifier paths that corresponds to the number of antennas. The typical number of antenna elements is variable and depends on the use scenario; several hundred antennas are used for typical satellite constellation applications.

An amplifier module as mentioned here (signal transmission case and/or signal reception case) may have various functional demands made on the amplifier module that may require the amplifier module to be physically divided into multiple spatially separated submodules. Such functional demands may be: RF gain, setting of phase and attenuation/gain factor (e.g. for beam control or temperature compensation), RF filtering, insulation, polarization (generally production of circular polarization, possibly also as a polarization multiplex by way of combination of two functional sections onto one antenna), and finally the antenna element itself.

The waveguide arrangement described here may advantageously be used to make an RF connection between these aforementioned submodules.

According to one aspect, there may be provision for a communication satellite having an antenna installation, the waveguide arrangement described here being arranged to make an RF connection between modules and/or submodules of a functional section of the antenna installation.

Further configurations of the waveguide arrangement are described with reference to the drawings that follow.

BRIEF DESCRIPTION OF THE DRAWINGS

Exemplary embodiments of the invention are discussed more thoroughly below on the basis of the appended drawings. The representations are schematic and not to scale. Identical reference signs relate to identical or similar elements throughout the detailed description of the drawings. In the drawings.

DETAILED DESCRIPTION OF THE INVENTION

Figure 1:
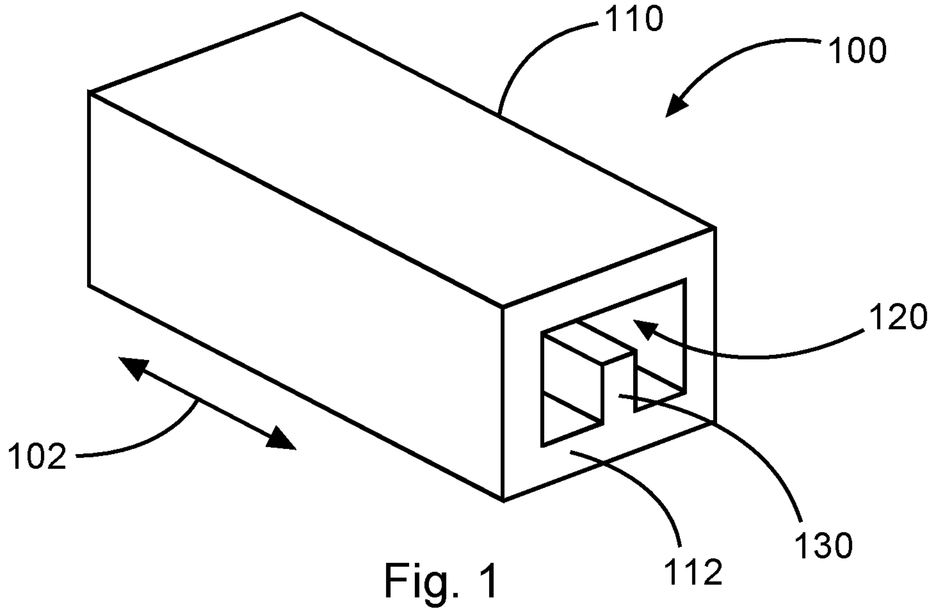
FIG. 1 shows a schematic representation of a ridged waveguide.

FIG. 1 shows the general design of a ridged waveguide 100. The ridged waveguide 100 comprises a casing 110. The casing 110 surrounds a cavity 120. A ridge 130 extends in the cavity 120. The casing 110, the cavity 120 and the ridge 130 extend in a longitudinal direction 102. The casing 110 has a rectangular cross-section in the example in FIG. 1. Other cross-sectional shapes are possible, however, for example square, with or without rounded edges, elliptical, circular, etc. The casing 110 is formed from multiple walls 112, the walls 112 surrounding the cavity 120. The end faces of the casing 110 are open, with the result that the cavity 120 is accessible. An electromagnetic wave is fed into the ridged waveguide 100 at one end face and then propagates in the longitudinal direction 102 through the cavity 120 in the direction of the opposite end face. A ridged waveguide 100 as described herein is thus used to transmit electromagnetic waves, or signals, in a radio-frequency range.

The casing 110 and the ridge 130 comprise an electrically conductive material. By way of example, the casing 110 and the ridge 130 are made from a metallic material or are coated with such a material. The ridge 130 projects into the cavity 120 from one wall 112 as a comb. The ridge 130 is conductively connected to the casing 110. By way of example, the ridge 130 is produced together with the casing 110 or a portion of the casing 110 from one block of material. Accordingly, the ridge 130 and at least a portion of the casing 110 are integral. However, the casing 110 may also be made up of two or more shell halves or shell portions. In general, the ridged waveguide 100 may be manufactured using different manufacturing and production techniques. One section or portion of the ridged waveguide 100 may be manufactured by means of 3D printing, for example, whereas other sections or portions are manufactured from a material body by means of milling. In principle, however, any suitable methods of manufacture are possible for each section, or portion, of the ridged waveguide.

The geometrical design of the ridged waveguide 100 and in particular the positioning of the ridge 130 in the cavity 120 may have a positive effect on the transmission properties of radio-frequency signals via the ridged waveguide 100.

In order to connect two ridged waveguides 100 to one another at their end faces, the end faces are typically connected to one another using a butt joint by placing the two end faces to be connected abutting one another and connecting them, for example using a flange or a screw or clamp connection. However, such additional connecting elements have the disadvantage that the additional connecting elements require additional installation space or assembly space, which is disadvantageous for use in large quantities.

Figure 2:
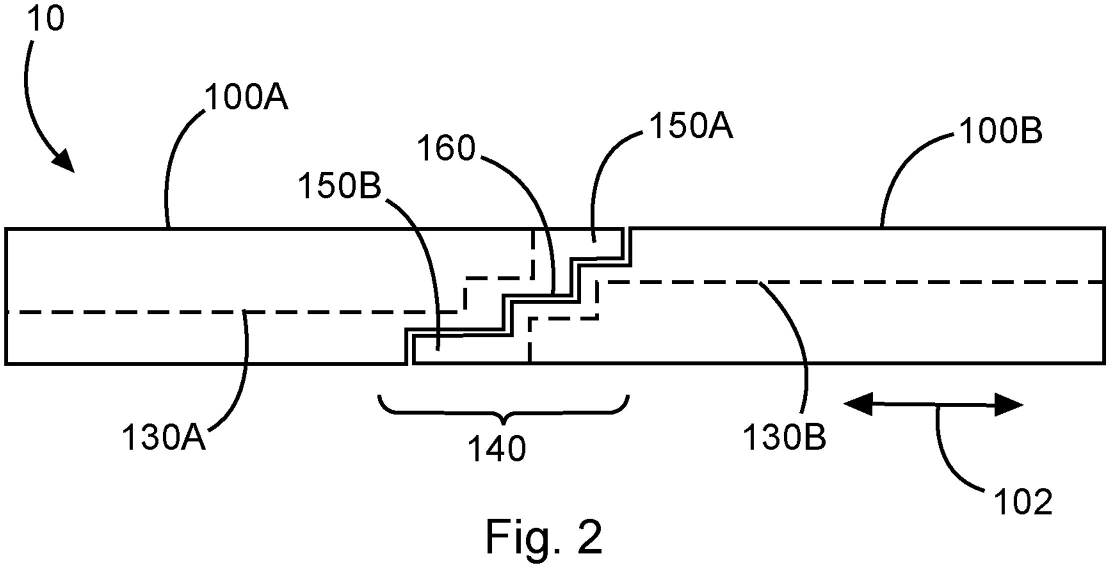
FIG. 2 shows a schematic representation of a waveguide arrangement.

FIG. 2 shows a waveguide arrangement 10 containing a first ridged waveguide 100A and a second ridged waveguide 100B. The first ridged waveguide 100A and the second ridged waveguide 100B are connected to one another in a connecting section 140, with the result that an electromagnetic wave propagating in the first ridged waveguide 100A is coupled into the second ridged waveguide 100B (or vice versa).

The waveguide arrangement 10 shown in FIG. 2 is distinguished in particular in that a separate connecting element is dispensed with in the connecting section 140. Rather, the first ridged waveguide and the second ridged waveguide have an altered shape and design in the connecting section such that the two ridged waveguides are joined to one another to produce a capacitive coupling between the first ridge 130A and the second ridge 130B.

The first ridged waveguide and the second ridged waveguide are in particular connected to one another in such a way that the outer surfaces thereof merge flush one into the other. Preferably, the same applies to the inner surfaces defining the cavity. Accordingly, in the preferred configuration, both the outer surfaces of the ridged waveguides and the inner surfaces of the ridged waveguides merge substantially without offset.

In this configuration, the first ridged waveguide 100A and the second ridged waveguide 100B are of identical design in respect of their shape in the connecting section 140. The second ridged waveguide 100B is merely rotated through 180°, and is connected to the first ridged waveguide 100A in the connecting section 140.

The first ridge 130A runs on the top wall in the first ridged waveguide 100A, this direction statement "top" and also other direction statements in this description referring to the representations in the figures. The second ridge 130B runs on the bottom wall in the second ridged waveguide 100B. The ridges 130A, 130B are shown in dashes and extend in the longitudinal direction 102 of the waveguide arrangement 10.

The first ridge 130A comprises a first retaining lug 150A and the second ridge 130B comprises a second retaining lug 150B in the connecting section 140. The two retaining lugs fit into corresponding depressions in the particular other ridged waveguide. A stepped transition from one ridged waveguide to the other ridged waveguide may be seen in the cross-sectional representation in FIG. 2.

The shape and the size of the ridge 130A, 130B also change in the connecting section 140. The reason for this is that the cross-section of the ridged waveguides is altered in the connecting section 140 so that the ridged waveguides are connected to one another without offset at the top, at the bottom, at the front or at the rear (referenced to the plane of the drawing).

A signal crossover 160 for radio-frequency signals is arranged between the two retaining lugs 150A, 150B in the connecting section 140 and in the longitudinal direction 102. The two ridges 130A, 130B are capacitively coupled to one another at this signal crossover 160. By way of example, an electromagnetic wave in the waveguide arrangement 10 propagates from left to right in the longitudinal direction 102 along the first ridge 130A, the electromagnetic wave is capacitively coupled into the second ridge 130B at the signal crossover 160, and then propagates in the longitudinal direction 102 again along the second ridge 130B.

Even though two ridged waveguides are connected to one another in FIG. 2, the waveguide arrangement 10 described herein is not restricted to this configuration and may instead comprise one ridged waveguide and one conventional waveguide, the conventional waveguide in this second variant corresponding to the second ridged waveguide, but without there being a ridge in this second waveguide. The other features relating to the casing also apply to the conventional waveguide.

Figure 3:
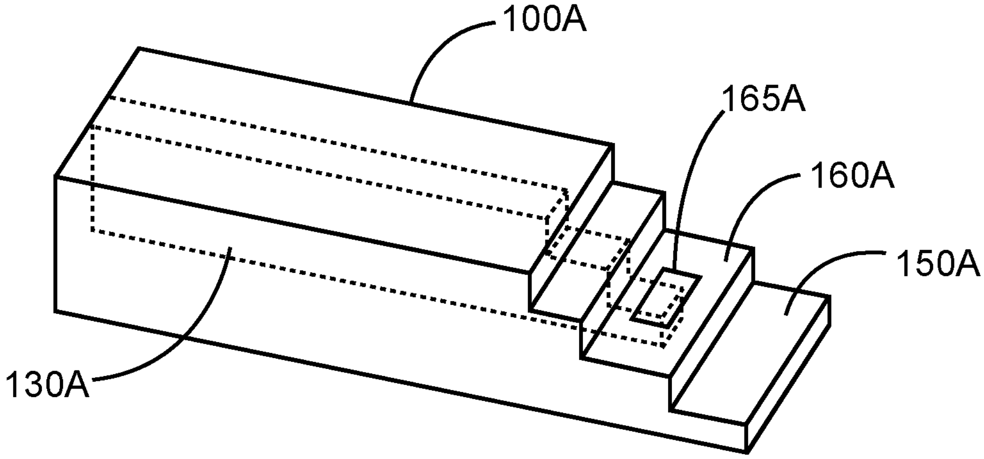
FIG. 3 shows a schematic representation of a ridged waveguide.

FIG. 3 shows an isometric representation of the first ridged waveguide 100A by way of illustration. The first retaining lug 150A, the signal crossover 160A with a window 165A and a further step as mating piece for the second retaining lug 150B (see FIG. 2) may be seen in this representation. The first ridge 130A in the first ridged waveguide 100A is shown by dashed lines. The height of the first ridge 130A changes along the longitudinal direction of the ridged waveguide 100A. In particular, the height and quite generally the cross-sectional area of the first ridge 130A decrease as the connecting section 140 or the second ridged waveguide 100B is increasingly approached.

Figure 4:
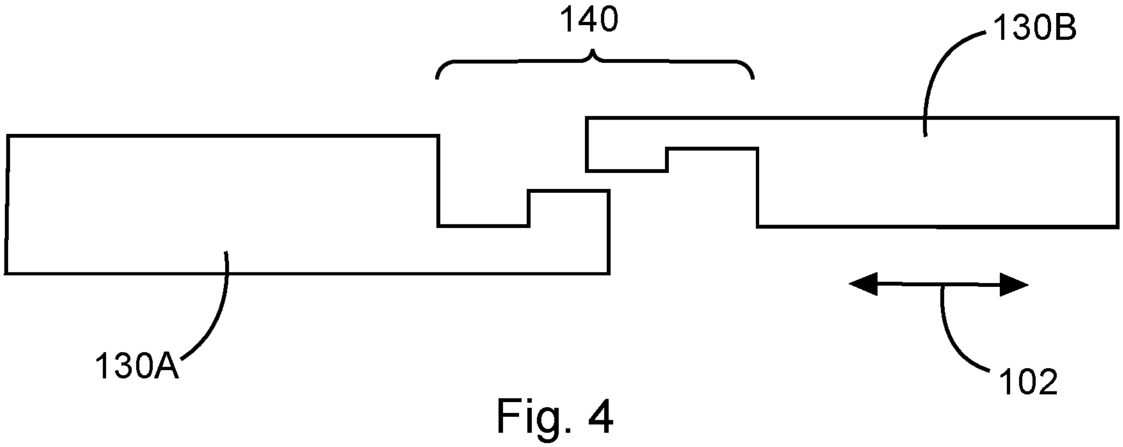
FIG. 4 shows a schematic representation of two capacitively coupled ridges of two ridged waveguides.

FIG. 4 shows, by way of illustration, the relative arrangement of the two ridges 130A, 130B in a state in which the two ridged waveguides 100A, 100B as shown in FIG. 2 are connected to one another. For the purposes of simpler representation, FIG. 4 shows only the ridges and not the other elements of the ridged waveguides.

As may clearly be seen, the height and the shape of the ridges change in the connecting section 140. The exact adaptation of the shape of the ridges is a matter relating to the properties of the crossover of a radio-frequency electromagnetic wave, or the radio-frequency transformation, in the connecting section 140.

At least part of the two ridges 130A and 130B overlaps in the longitudinal direction 102 in the connecting section 140. The coupling, or the capacitive crossover, between the two ridges takes place at this point.

Figure 5:
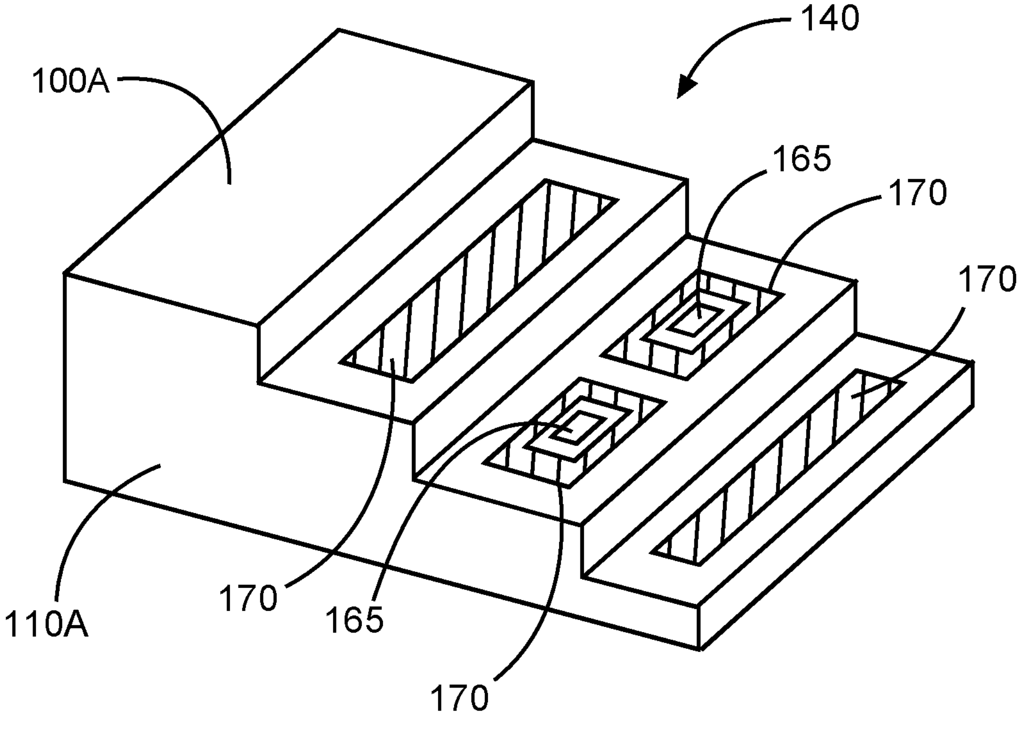
FIG. 5 shows a schematic representation of a ridged waveguide.

FIG. 5 shows a detailed representation of the design of a waveguide 100A in the connecting section 140. The casing 110A has a stepped profile, with the extreme right step corresponding to the retaining lug and the extreme left step being the mating piece for the retaining lug of the other waveguide. The radio-frequency crossover between the two waveguides takes place by way of the middle step. Here, one or more windows 165 in the form of apertures are arranged in the casing 110A. The same number of windows is arranged in both waveguides. When two waveguides are connected to one another, the windows are situated above one another and allow a signal crossover transversely with respect to the longitudinal direction 102 (see FIG. 2) of the waveguide arrangement. An electromagnetic wave is transmitted from one waveguide to the other waveguide through the windows 165.

The number of windows also corresponds to the number of transmission channels that may be transmitted by way of a waveguide arrangement. If for example two ridged waveguides are connected to one another, there is preferably provision for a single ridge, spatially associated with a window 165, for each transmission channel. A ridge ends close to or below a window 165 in each case To connect two waveguides to one another, there is provision for the two retaining lugs to be connected to the casing of the particular other waveguide by way of an adhesive area 170. The adhesive areas are represented by a shaded area in FIG. 5. The adhesive used here is preferably an electrically conductive adhesive, or a metallic adhesive.

To insulate two spatially adjacent transmission channels in the connecting section 140 from one another, the respective windows 165 are likewise enclosed by an adhesive area 170. By way of example, adhesive may be applied to the middle step around a window 165 in a closed line, wherein the applying adhesive is being repeated for each window 165. When the second waveguide is pressed onto the first waveguide in the connecting section 140, two spatially adjacent transmission channels are insulated from one another in respect of radio-frequency electromagnetic waves because the adhesive surrounding the windows 165 fills a gap between the two waveguides in the connecting section.

Figure 6:
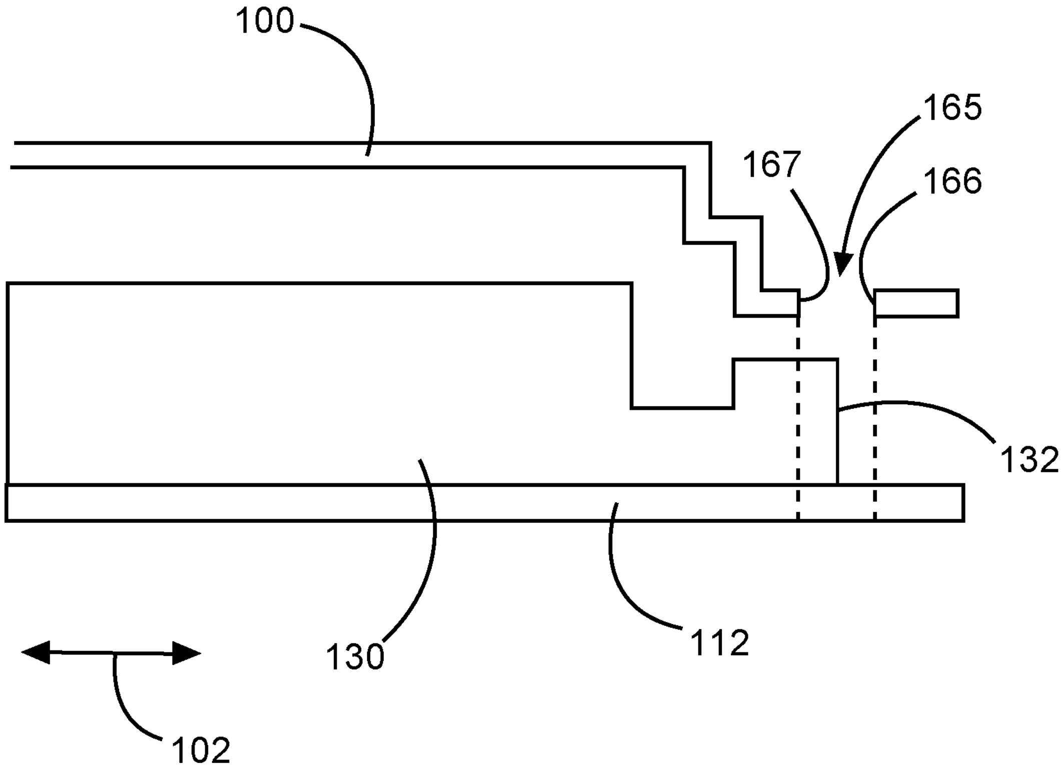
FIG. 6 shows a schematic representation of a sectional view of a ridged waveguide.

FIG. 6 shows a sectional view of a ridged waveguide 100 and in particular highlights the relative position of an end face 132 of the ridge 130 in relation to the window 165 in the casing of the ridged waveguide 100. The ridge 130 extends in the longitudinal direction 102 in the cavity of the ridged waveguide 100. The cross-section and the height of the ridge 130 changes in the direction of the connecting section and extends into the stepped region of the connecting section. In a variant that is shown in FIG. 6, the end face 132 extends in the longitudinal direction 102 to the degree that the end face 132 protrudes beyond the rear edge 167 of the window 165 (that is to say in the longitudinal direction 102 and in the direction of the other waveguide), but the end face 132 of the ridge 130 ends before the front edge 166 (which is the edge closest to the other waveguide). In this example, (only) part of the ridge 130 thus overlaps the window 165 in the longitudinal direction. It is conceivable for the end face 132 of the ridge 130 to end to the left of the rear edge 167.

Additionally, it should be pointed out that "comprising" does not preclude other elements or steps and "a(an)" or one" does not preclude a plurality. Furthermore, it will be pointed out that features or steps that have been described with reference to one of the above exemplary embodiments may also be used in combination with other features or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 waveguide arrangement
100 ridged waveguide
100A first ridged waveguide
100B second ridged waveguide
102 longitudinal direction
110 casing
112 wall
120 cavity
130 ridge
132 end face
140 connecting section
150 retaining lug
160 signal crossover
165 window
166 front edge
167 rear edge
170 adhesive area

The invention claimed is:

1. A ridged waveguide arrangement, comprising:
a first ridged waveguide; and
a second waveguide;
wherein the first ridged waveguide comprises a first casing with a first cavity and a first ridge extending in the first cavity in a longitudinal direction, the first ridge conductively connected to a wall of the first casing;
wherein the second waveguide comprises a second casing with a second cavity;
wherein the first ridged waveguide overlaps the second waveguide in the longitudinal direction of the waveguide arrangement in a connecting section to produce a capacitive coupling between the first ridge and the second waveguide; and
wherein at least sections of the first ridge have a height in the connecting section that is lower than a height of the first ridge outside the connecting section.

2. The waveguide arrangement according to claim 1,
wherein the second waveguide is a ridged waveguide and comprises a second ridge extending in the second cavity in the longitudinal direction;
wherein the second ridge is conductively connected to a wall of the second casing;
wherein the capacitive coupling is between the first ridge and the second ridge.

3. The waveguide arrangement according to claim 2, wherein at least sections of the second ridge overlap the first casing in the longitudinal direction in the connecting section.

4. The waveguide arrangement according to claim 2, wherein the first ridged waveguide and the second ridged waveguide have rotational symmetry of order 2 with respect to one another in the connecting section.

5. The waveguide arrangement according to claim 2, wherein the at least sections of the first ridge overlap the second ridge in the longitudinal direction in the connecting section.

6. The waveguide arrangement according to claim 1,
wherein the first casing comprises a first window;
wherein the second casing comprises a second window; and
wherein the first window overlaps the second window in the connecting section.

7. The waveguide arrangement according to claim 6, wherein the first window and the second window are of identical proportions and shape and overlap one another without offset.

8. The waveguide arrangement according to claim 6,
wherein the second waveguide is a ridged waveguide and comprises a second ridge extending in the second cavity in the longitudinal direction,
wherein at least part of the first ridge overlaps the first window in the longitudinal direction; and
wherein at least part of the second ridge overlaps the second window in the longitudinal direction.

9. The waveguide arrangement according to claim 6,
wherein the first window is completely surrounded by an electrically conductive adhesive in a circumferential direction, said adhesive defining an adhesive area that completely surrounds the first window; and
wherein the adhesive adhesively bonds the first ridged waveguide to the second ridged waveguide.

10. The waveguide arrangement according to one claim 1, wherein the at least sections of the first ridge overlap the second casing in the longitudinal direction in the connecting section.

* * * * *